(12) United States Patent
Ueda et al.

(10) Patent No.: US 8,532,903 B2
(45) Date of Patent: Sep. 10, 2013

(54) CONTROL SYSTEM FOR INTERNAL COMBUSTION ENGINE

(75) Inventors: Hirofumi Ueda, Wako (JP); Akira Odajima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 457 days.

(21) Appl. No.: 12/432,074

(22) Filed: Apr. 29, 2009

(65) Prior Publication Data

US 2009/0299587 A1    Dec. 3, 2009

(30) Foreign Application Priority Data

May 30, 2008    (JP) ................................ 2008-143440

(51) Int. Cl.
*F02D 41/40*    (2006.01)
*F02D 29/02*    (2006.01)
*F02D 41/04*    (2006.01)

(52) U.S. Cl.
USPC ............. 701/86; 701/104; 123/299; 180/197; 477/109

(58) Field of Classification Search
USPC ............... 701/103, 115, 104, 105, 54, 64, 84, 701/86; 705/104; 700/274; 123/275, 445, 123/568.11, 568.16, 299, 295, 568.21, 435; 477/109; 180/197
See application file for complete search history.

(56) References Cited

U.S. PATENT DOCUMENTS

| | | | | |
|---|---|---|---|---|
| 4,530,337 A | * | 7/1985 | Laufer | 123/506 |
| 4,567,868 A | * | 2/1986 | Yasuhara | 123/300 |
| 4,617,894 A | * | 10/1986 | Kampichler | 123/372 |
| 4,703,823 A | * | 11/1987 | Yogo et al. | 180/197 |
| 4,785,917 A | * | 11/1988 | Tateno et al. | 477/78 |
| 4,836,161 A | * | 6/1989 | Abthoff et al. | 123/299 |
| 4,975,029 A | * | 12/1990 | Hatz | 417/494 |
| 5,074,766 A | * | 12/1991 | Kochanowski | 417/496 |
| 5,168,847 A | * | 12/1992 | Grieshaber et al. | 123/299 |
| 5,592,915 A | * | 1/1997 | Ishiwata et al. | 123/300 |
| 5,713,332 A | | 2/1998 | Adler et al. | |
| 6,125,314 A | | 9/2000 | Graf et al. | |
| 6,578,546 B2 | * | 6/2003 | Schultalbers et al. | 123/300 |
| 6,634,450 B1 | | 10/2003 | Fukumura et al. | |

(Continued)

FOREIGN PATENT DOCUMENTS

| | | | |
|---|---|---|---|
| DE | 3416355 A | * | 11/1985 |
| DE | 4112808 | * | 6/1992 |

(Continued)

OTHER PUBLICATIONS

JPO machine translation of JP 11-173186.*

(Continued)

*Primary Examiner* — James Trammell
*Assistant Examiner* — David Testardi
(74) *Attorney, Agent, or Firm* — Arent Fox LLP

(57) ABSTRACT

A control system for an internal combustion engine having at least one fuel injection valve for injecting fuel in a combustion chamber of the engine. A main injection and a pilot injection are performed through the at least one fuel injection valve, the pilot injection being performed before the main injection. A demand output of the engine is temporarily reduced upon a request for reducing an output of the engine. The output of the engine is reduced when the demand output is reduced. A control of the pilot injection corresponding to a state where the demand output is not reduced is performed when the demand output is reduced.

4 Claims, 2 Drawing Sheets

(56) References Cited

U.S. PATENT DOCUMENTS

| | | | |
|---|---|---|---|
| 6,820,588 B2 * | 11/2004 | Happenhofer et al. | 123/299 |
| 6,907,861 B2 * | 6/2005 | Asano et al. | 123/395 |
| 7,021,288 B2 * | 4/2006 | Asano et al. | 123/435 |
| 7,769,535 B2 * | 8/2010 | Ullrich et al. | 701/110 |
| 7,806,100 B2 * | 10/2010 | Schnorbus et al. | 123/299 |
| 2001/0015192 A1 | 8/2001 | Urushihara et al. | |
| 2003/0116123 A1 * | 6/2003 | Ito et al. | 123/299 |
| 2005/0229903 A1 * | 10/2005 | Kobayashi et al. | 123/435 |
| 2006/0005804 A1 | 1/2006 | Kuo et al. | |
| 2008/0097682 A1 * | 4/2008 | Peron et al. | 701/103 |
| 2008/0281500 A1 * | 11/2008 | Nakata et al. | 701/103 |

FOREIGN PATENT DOCUMENTS

| | | | |
|---|---|---|---|
| DE | 102005001428 A * | 9/2005 | |
| EP | 512458 A1 * | 11/1992 | |
| EP | 1413724 A2 * | 4/2004 | |
| GB | 2218161 A * | 11/1989 | |
| JP | 60050030 A * | 3/1985 | |
| JP | 61129343 A * | 6/1986 | |
| JP | 64-4544 A | 1/1989 | |
| JP | 05086929 A * | 4/1993 | |
| JP | 07232572 A * | 9/1995 | |
| JP | 11173186 A * | 6/1999 | |
| JP | 2001-342877 A | 12/2001 | |
| JP | 2002-188476 A | 7/2002 | |
| JP | 2002221067 A * | 8/2002 | |
| JP | 2004301007 A * | 10/2004 | |
| JP | 2005-48739 A | 2/2005 | |
| JP | 2006-283690 A | 10/2006 | |
| WO | WO 2005/100767 A1 | 10/2005 | |

OTHER PUBLICATIONS

Translation of JP 60-50030 A (original JP document published Mar. 19, 1985).*

Translation of JP 61-129343 A (original JP document published Jun. 17, 1986).*

Article entitled "Diesel Injection Systems", Stationary Engine Newsgroup, Jun. 1998, Copyright Peter & Rita Forbes, 5 pages, downloaded from http://www.oldengine.org/members/diesel/articles/diesel1.htm.*

* cited by examiner

CONTROL SYSTEM FOR INTERNAL COMBUSTION ENGINE

BACKGROUND OF THE INVENTION

1. Field of the Invention

The present invention relates to a control system for an internal combustion engine, and particularly to a control system which performs a fuel injection control for injecting fuel into a combustion chamber of the internal combustion engine, wherein a pilot injection is performed before a main injection.

2. Description of the Related Art

Japanese Patent Laid-open No. 2005-48739 (JP '739) discloses a control system for a diesel engine, which performs a fuel injection that includes a combination of a pilot injection and a main injection. According to the control system disclosed by JP '739, when an output torque of the engine needs to be reduced when the gears of an automatic transmission are shifted, a fuel injection amount is reduced. In such a case, when a fuel injection amount of the main injection is increased, an execution timing of the main injection is retarded, and when a fuel injection amount of the pilot injection is reduced, an execution timing of the pilot injection is advanced.

The control method disclosed in JP '739 aims to suppress a change in the air-fuel ratio when performing the output torque reduction control of the engine. However, a combustion noise is not taken into consideration when performing the disclosed control method. Therefore, if the control method disclosed in JP '739 is executed or otherwise performed, a problem wherein combustion noises increase due to combustion of the fuel injected by the pilot injection, occurs. A reason why the combustion noises increase is believed to be that the intake air flow rate temporarily becomes excessive with respect to an amount of the injected fuel when performing the reduction control of the output torque, and the combustion of the fuel injected by the pilot injection proceeds rapidly.

SUMMARY OF THE INVENTION

The present invention was derived while contemplating the above described issue(s), and an aspect of the invention is to provide a control system for an internal combustion engine, which suppresses an increase in combustion noises due to the combustion of the fuel injected in the pilot injection when performing temporary output torque reduction control.

To attain the above aspect, the present invention provides a control system for an internal combustion engine having fuel injection means for injecting fuel in a combustion chamber of the engine. The control system includes fuel injection control means, demand output changing means, and output reduction means. The fuel injection control means performs a main injection and a pilot injection before the main injection is performed by the fuel injection means. The demand output changing means temporarily changes a demand output (TRQ) of the engine. The output reduction means reduces the output (TRQ) of the engine when the demand output (TRQ) is reduced by the demand output changing means. The fuel injection control means performs a control of the pilot injection corresponding to a state where the demand output (TRQ) is not reduced when the demand output (TRQ) is reduced.

With the above-described structural configuration, when the demand output of the engine is reduced, the output of the engine is reduced and the control of the pilot injection corresponding to the state where the demand output is not reduced is performed. By performing the pilot injection control corresponding to the state where the engine output is not reduced, the state where the intake air flow rate is excessive for the fuel injection amount is avoided. Consequently, an increase in combustion noises due to the rapid combustion of the fuel injected by the pilot injection is suppressed.

Preferably, the demand output changing means is at least one of transmission control means and traction control means. The transmission control means performs a transmission control of a transmission connected to an output shaft of the engine, and the traction control means performs a traction control for reducing a slip of driving wheels of a vehicle driven by the engine.

With the above-described structural configuration, when performing the transmission control of the transmission, and/or performing the traction control for reducing the driving wheel slip, the engine demand output is temporarily reduced. Consequently, when performing the transmission control and/or the traction control, any increase in combustion noise is suppressed.

Preferably, the transmission control means reduces the demand output when changing a shift position of the transmission.

With the above-described structural configuration, when changing the shift position of the transmission, the demand output is reduced. Consequently, upon changing the shift position, the increase in combustion noise is suppressed.

Preferably, the output reduction means performs the reduction of the engine output by reducing a fuel injection amount of the main injection.

With the above-described structural configuration, the reduction of the engine output is performed by reducing the fuel injection amount of the main injection. Since the fuel injection amount of the pilot injection is set to a value corresponding to the state where the output reduction control is not performed, the engine output is reduced by reducing the fuel injection amount of the main injection.

Preferably, the fuel injection control means controls a fuel injection amount (QP) and a fuel injection timing of the pilot injection according to the demand output of the engine, wherein the fuel injection timing of the pilot injection is defined by an interval (CAINT) from a fuel injection timing of the main injection, and wherein the interval is controlled according to the demand output (TRQ) of the engine.

With the above-described structural configuration, the fuel injection amount of the pilot injection and the fuel injection timing, i.e., the interval from the main injection timing, are controlled according to the demand output. Therefore, when the demand output of the engine is temporarily reduced by the demand output changing means, regardless of any reduction in the demand output, the fuel injection amount of the pilot injection, and the interval of the pilot injection and the main injection are set to values corresponding to a state where the demand output is not reduced to suppress any increase in combustion noise.

DETAILED DESCRIPTION OF PREFERRED EMBODIMENTS

Preferred embodiments of the present invention will now be described with reference to the drawings.

Figure 1:
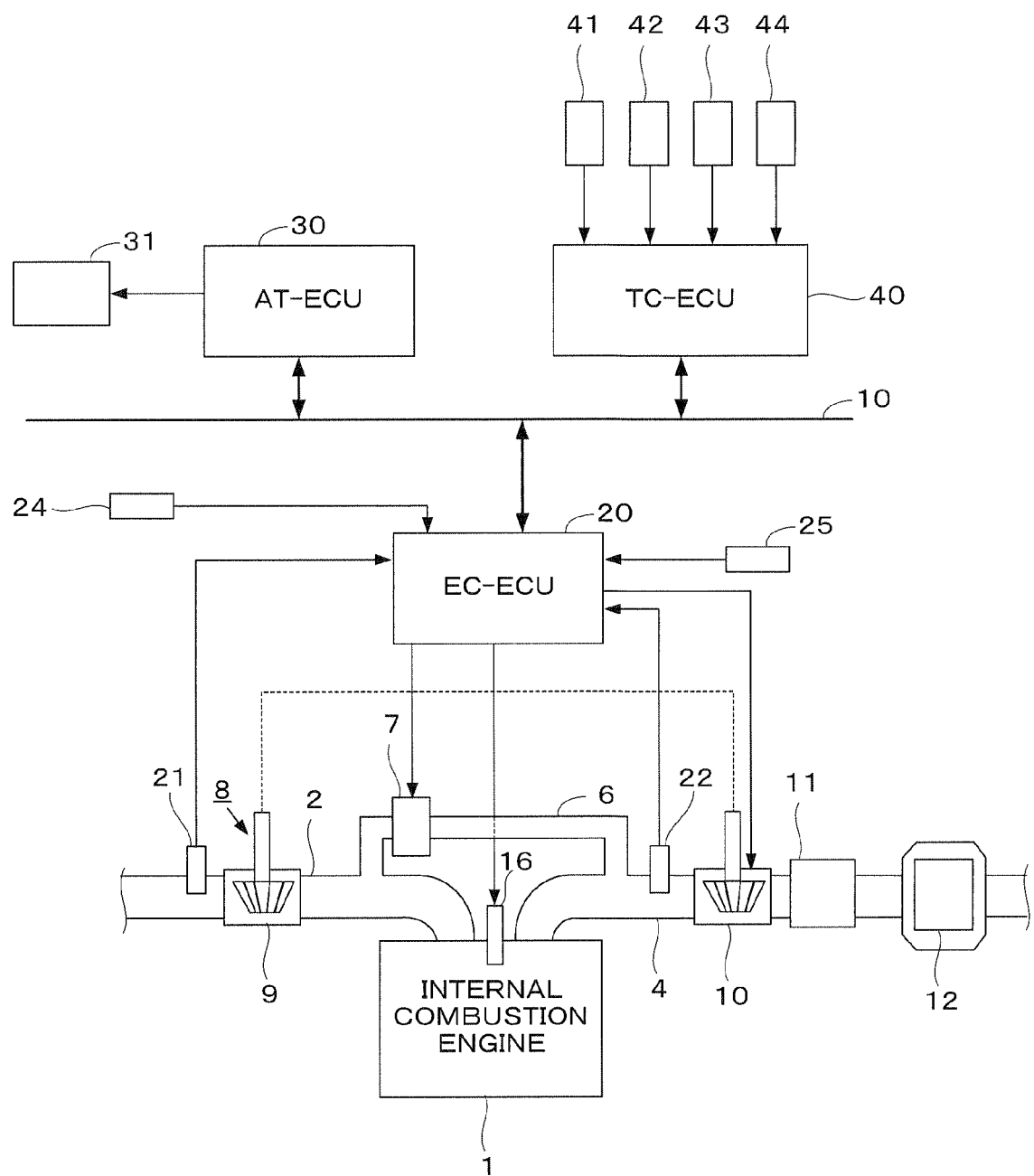
FIG. 1 is a schematic diagram of a control system for a vehicle according to an embodiment of the present invention.

FIG. 1 is a schematic diagram of a control system for a vehicle according to an embodiment of present invention. An internal combustion engine 1 (hereinafter referred to as "engine") is a diesel engine wherein fuel is injected directly into the cylinders. Each cylinder is provided with a fuel injection valve 16 electrically connected to an engine control electronic control unit 20 (hereinafter referred to as "EC-ECU"). The EC-ECU 20 controls a valve opening period and a valve opening timing of each fuel injection valve 16.

The engine 1 has an intake pipe 2, an exhaust pipe 4, an exhaust gas recirculation passage 6, and a turbocharger 8. The exhaust gas recirculation passage 6 is provided between the intake pipe 2 and the exhaust pipe 4. The exhaust gas recirculation passage 6 is provided with an exhaust gas recirculation control valve 7 (hereinafter referred to as "EGR valve") that controls the amount of exhaust gases that are recirculated. The valve opening of the EGR valve 7 is controlled by the EC-ECU 20.

The turbocharger 8 has a turbine 10 driven by the kinetic energy of exhaust gases and a compressor 9 for compressing the intake air. The compressor 9 is rotationally driven by the turbine 10.

The turbine 10 has a plurality of movable vanes (not shown) and is configured wherein the rotational speed of the turbine 10 is adjusted by changing an opening of the movable vanes. The vane opening of the turbine 10 is electro-magnetically controlled by the EC-ECU 20.

The exhaust pipe 4 is provided with a NOx adsorbing catalyst 11 for removing NOx in exhaust gases and a diesel particulate filter 12 (hereinafter referred to as "DPF"). The NOx adsorbing catalyst 11 adsorbs NOx in an oxidized state where the oxygen concentration in the exhaust gases is relatively high. In a reducing state where the concentration of reducing components in the exhaust gases is relatively high, the NOx adsorbing catalyst 11 desorbs and reduces the adsorbed NOx to discharge nitrogen gas. The DPF 12 traps soot, which consists of particulates whose main component is carbon (C), in the exhaust gases when the exhaust gases pass through small holes in the filter wall. Specifically, the inflowing soot is accumulated on the surface of the filter wall and in the small holes in the filter wall.

The intake pipe 2 is provided with an intake air flow rate sensor 21 for detecting a flow rate of fresh intake air flowing into the engine 1 (the flow rate will hereinafter be referred to as "intake air flow rate") MAIR. An oxygen concentration sensor 22 which detects an oxygen concentration O2C in the exhaust gases is provided in the exhaust pipe 4 upstream of the NOx adsorbing catalyst 11. A crank angle position sensor 24 detects a rotational angle of the crankshaft of the engine 1, and an accelerator sensor 25 detects an operation amount AP of an accelerator pedal of the vehicle driven by the engine 1 (this operation amount will be hereinafter referred to as "accelerator operation amount"). The detection signals of the sensors 21-22 and 24-25 are supplied to the EC-ECU 20. A rotational speed NE of the engine 1 is calculated from the output of the crank angle position sensor 24. Further, a demand torque TRQ of the engine 1 is calculated according to the accelerator operation amount AP and is set to increase as the accelerator operation amount AP increases.

A transmission control electronic control unit 30 (hereinafter referred to as "AT-ECU") and a traction control electronic control unit 40 (hereinafter referred to as "TC-ECT") are connected to the EC-ECU 20 via a data bus 10. The ECUs 20, 30 and 40 mutually transmit detected parameters and control parameters via the data bus 10.

The EC-ECU 20 includes an input circuit, a central processing unit (hereinafter referred to as "CPU"), a memory circuit, and output circuit. The input circuit performs numerous functions, including shaping the waveforms of input signals from various sensors, correcting the voltage levels of the input signals to a predetermined level, and converting analog signal values to digital signal values. The memory circuit preliminarily stores various operating programs to be executed by the CPU and stores the results of computations or the like executed by the CPU. The output circuit supplies control signals to the fuel injection valve 16 and the EGR valve 7. ECUs 30 and 40, respectively, similarly include the input circuit, the CPU, the memory circuit, and the output circuit.

The AT-ECU 30 performs a transmission control of a transmission 31 connected to an output shaft of the engine 1 according to operation parameters, such as a vehicle speed VP and the demand torque TRQ. When changing the shift position of the transmission 31 (performing an up-shift or a down-shift), the AT-ECU 30 outputs a torque reduction demand signal, which demands that the output torque of the engine 1 is reduced during a predetermined time period TSFT (e.g., 200 to 350 milliseconds) in order to suppress the torque shock occurring upon the shift change (specifically a shift torque reduction flag FSHCNG is set to "1" during the predetermined time period TSFT).

Driving wheel speed sensors 41 and 42, respectively, detect driving wheel speeds VDL and VDR of right and left driving wheels of the vehicle, and trailing wheel speed sensors 43 and 44, respectively, detect trailing wheel speeds VNL and VNR of right and left trailing wheels of the vehicle are connected to the TC-ECU 40. The detection signals of the sensors 41-44 are supplied to the TC-ECU 40. The vehicle speed VP is calculated as an average value of the trailing wheel speeds VNL and VNR. The TC-ECU 40 determines a slipping condition of the driving wheel based on the driving wheel speeds VDL and VDR and the trailing wheel speeds VNL and VNR. When determining that an excessive slip has occurred, the TC-ECU 40 outputs the torque reduction demand signal, which demands reducing the output torque of the engine (specifically, a traction control flag FTC set to "1" until the excessive slip condition is eliminated).

The EC-ECU 20 calculates an amount of fuel to be injected from the fuel injection valve 16 according to the operating condition (the engine rotational speed NE and the demand torque TRQ) of the engine 1, and performs a fuel injection by a combination of a main injection and a pilot injection preceding the main injection. Specifically, by the process shown in FIG. 2, the EC-ECU 20 calculates a fuel injection amount of the main injection (the injection amount will be referred to as "main injection amount") QM and a fuel injection amount of the pilot injection (the injection amount will be referred to as "pilot injection amount") QP, and an execution timing of the main injection (the injection timing will be referred to as "main injection timing") CAM, and an execution timing of the pilot injection (the injection timing will be referred to as "pilot injection timing") CAP. The main injection and the pilot injection are performed according to the calculated fuel injection parameters QM, QP, CAM, and CAP.

Figure 2:
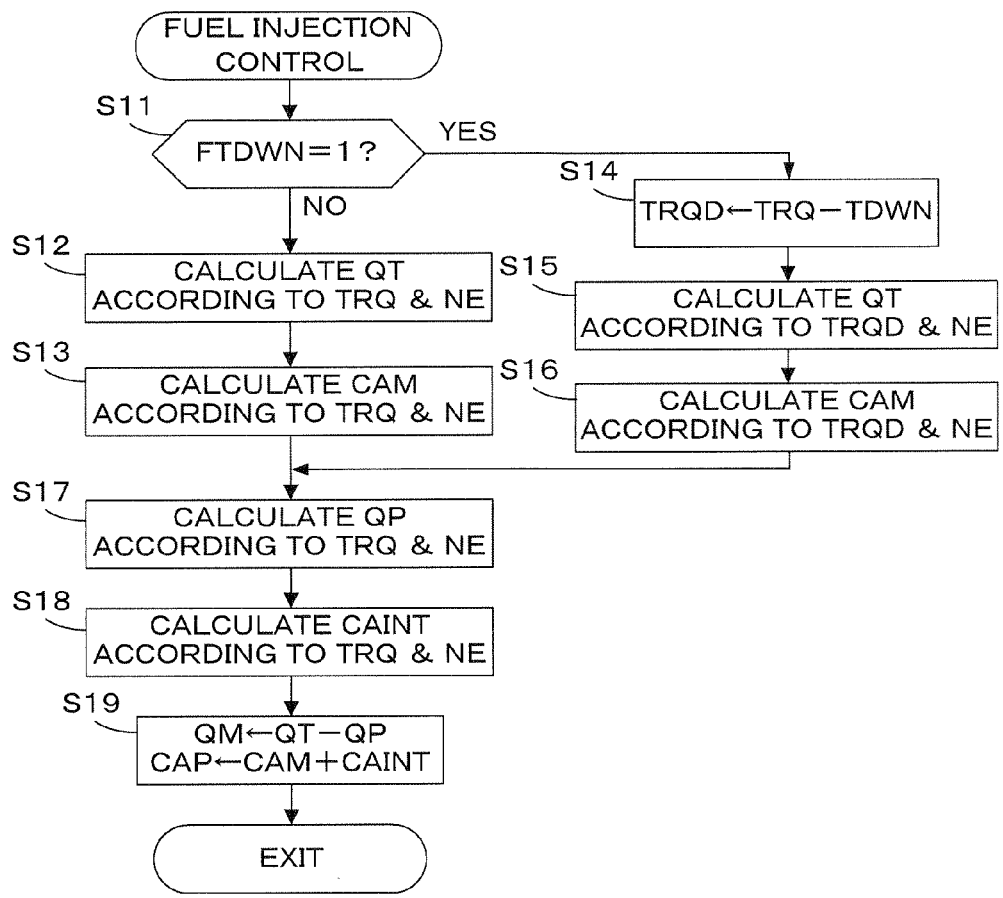
FIG. 2 is a flowchart of a fuel injection control for an internal combustion engine.

FIG. 2 is a flowchart of a process for controlling the fuel injection through the fuel injection valve 16. The process executed by the CPU in the EC-ECU 20 is synchronized with the rotation of the engine 1.

In step S11, it is determined whether a torque reduction demand flag FTDWN is equal to "1". The torque reduction demand flag FTDWN is set by the process of FIG. 3.

Figure 3:
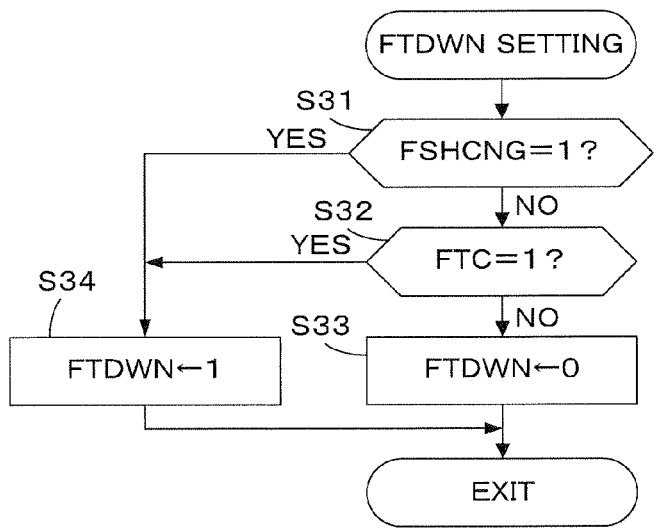
FIG. 3 is a flowchart of a process for setting a flag in the process of FIG. 2.

In step S31 of FIG. 3, it is determined whether the shift torque reduction flag FSHCNG is equal to "1". If the answer to step S31 is negative (NO), it is determined whether the traction control flag FTC is equal to "1" (step S32). If the answers to steps S31 and S32 are negative (NO), the torque reduction demand flag FTDWN is set to "0" (step S33). On the other hand, if any one of the answers to steps S31 and S32 is affirmative (YES), the torque reduction demand flag FTDWN is set to "1" (step S34).

Referring back to FIG. 2, if the answer to step S11 is negative (NO), i.e., the torque reduction control is not performed, a QT map (not shown) is retrieved according to the demand torque TRQ and the engine rotational speed NE to calculate a total injection amount QT, which is a sum of the main injection amount QM and the pilot injection amount QP. The QT map is set so that the total injection amount QT increases as the demand torque TRQ increases.

In step S13, a CAM map (not shown) is retrieved according to the demand torque TRQ and the engine rotational speed NE to calculate a main injection timing CAM.

In step S17, a QP map (not shown) is retrieved according to the demand torque TRQ and the engine rotational speed NE to calculate the pilot injection amount QP. The QP map is set so that the pilot injection amount QP increases as the demand torque TRQ increases.

In step S18, a CAINT map (not shown) is retrieved according to the demand torque TRQ and the engine rotational speed NE to calculate a time interval CAINT between the pilot injection timing CAP and the main injection timing CAM. The time interval CAINT is referred to as "injection time interval CAINT". The injection time interval CAINT is defined as an advancing angular amount from the main injection timing CAM. The CAINT map is set so that the injection time interval CAINT decreases as the demand torque TRQ increases.

In step S19, the main injection amount QM is calculated by the equation (1), and the pilot injection timing CAP is calculated by the equation (2).

$$QM=QT-QP \quad (1)$$

$$CAP=CAM+CAINT \quad (2)$$

On the other hand, if the answer to step S11 is affirmative (YES), i.e., the torque reduction control is performed, the process proceeds to step S14 in which a reduction demand torque TRQD is calculated by the equation (3).

$$TRQD=TRQ-TDWN \quad (3)$$

where TDWN is a predetermined torque reduction amount.

In step S15, the QT map is retrieved according to the reduction demand torque TRQD and the engine rotational speed NE to calculate the total injection amount QT. In step S16, the CAM map is retrieved according to the reduction demand torque TRQD and the engine rotational speed NE to calculate the main injection timing CAM. After executing step S16, the process proceeds to step S17.

According to the process of FIG. 2, the same calculation method for the normal control (i.e., the control in which the torque reduction is not performed) is used even when performing the torque reduction control. Specifically, the pilot injection amount QP and the injection time interval CAINT are not calculated using the reduction demand torque TRQD, but calculated using the demand torque TRQ. Accordingly, the pilot injection amount QP and the injection time interval CAINT are set to values corresponding to the normal control (i.e., values corresponding to the demand torque TRQ), thereby avoiding the state where the intake air flow rate is excessive for the pilot injection amount QP. Further, the injection time interval CAINT is set to a lower value compared with the case where the reduction demand torque TRQD is applied, and the pilot injection timing CAP is set to a retarded value compared with the case where the reduction demand torque TRQD is applied. Consequently, the combustion of fuel injected by the pilot injection is prevented from rapidly developing, thereby suppressing an increase in combustion noise.

In the afore-disclosed embodiment, the fuel injection valve 16 corresponds to the fuel injection means, and the EC-ECU 20 constitutes the fuel injection control means and the output reduction means. Specifically, FIG. 3 and steps S11, and S14 to S16 of FIG. 2 correspond to the output reduction means, and steps S12, S13, and S17 to S19 correspond to the fuel injection control means. Further, the AT-ECU 30 corresponds to the transmission control means, and the TC-ECU 40 corresponds to the traction control means. The ECUs 30 and 40 constitute the demand output change means.

The present invention is not limited to the embodiment described above, and various modifications may be made. For example, in a vehicle having a manual transmission, when a driver returns the accelerator pedal upon a shift-up, the demand torque corresponding to the accelerator operation amount AP immediately before returning the accelerator pedal (this demand torque will be referred to as "immediately-before demand torque") TRQB is stored, and the pilot injection amount QP and the injection time interval CAINT are calculated according to the immediately-before demand torque TRQB.

The present invention can be applied to a control system for a watercraft propulsion engine, such as an outboard engine having a vertically extending crankshaft.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A control system for an internal combustion engine having fuel injection means for injecting fuel in a combustion chamber of said engine, the control system comprising:
   fuel injection control means for performing a main injection and a pilot injection performed before the main injection;
   demand output changing means for temporarily changing a demand output of said engine, wherein said demand output changing means comprises traction control means for reducing a slip of driving wheels of a vehicle driven by said engine; and
   output reduction means for reducing an output of said engine when the demand output is reduced by said demand output changing means, wherein said output reduction means reduces the engine output by reducing a fuel injection amount of the main injection,
   wherein said fuel injection control means
      concurrently performs a control of the pilot injection corresponding to a normal demand output state when the demand output of said engine is temporarily reduced, and
      controls a fuel injection amount and a fuel injection timing of the pilot injection according to the demand output of said engine,
   wherein the fuel injection timing of the pilot injection is defined by an interval from a fuel injection timing of the main injection, and the interval is controlled according to the demand output of said engine.

2. The control system according to claim 1, wherein the demand output changing means also comprises transmission control means for performing a transmission control of a transmission connected to an output shaft of the engine, and the demand output changing means reduces the demand output when changing a shift position of said transmission.

3. A control method for an internal combustion engine having at least one fuel injection valve for injecting fuel in a combustion chamber of said engine, wherein a main injection and a pilot injection are performed through said at least one fuel injection valve, the pilot injection being performed before the main injection, the control method comprising:

temporarily reducing a demand output of said engine upon receiving a request for reducing an output of said engine from a traction control device, said traction control device performing a traction control for reducing a slip of driving wheels of a vehicle driven by said engine; and reducing an output of said engine when the demand output is reduced, wherein the reduction of the engine output is performed by reducing a fuel injection amount of the main injection, wherein a control of the pilot injection corresponding to a normal demand output state is concurrently performed when the demand output of said engine is temporarily reduced, and wherein a fuel injection amount and a fuel injection timing of the pilot injection are controlled according to the demand output of said engine, wherein the fuel injection timing of the pilot injection is defined by an interval from a fuel injection timing of the main injection, and the interval is controlled according to the demand output of said engine.

4. The control method according to claim 3, wherein the request is received from a transmission control device which performs a transmission control of a transmission connected to an output shaft of the engine, and reduces the demand output when changing a shift position of said transmission.

* * * * *